United States Patent
Jo et al.

(10) Patent No.: US 12,556,787 B2
(45) Date of Patent: Feb. 17, 2026

(54) CAMERA MODULE AND ELECTRONIC DEVICE COMPRISING SAME

(71) Applicant: Samsung Electronics Co., Ltd., Suwon-si (KR)

(72) Inventors: Kiyun Jo, Suwon-si (KR); Jongjun Kim, Suwon-si (KR); Heeyun Chung, Suwon-si (KR); Kihuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 18/531,172

(22) Filed: Dec. 6, 2023

(65) Prior Publication Data
US 2024/0107141 A1    Mar. 28, 2024

Related U.S. Application Data

(63) Continuation of application No. PCT/KR2022/008011, filed on Jun. 7, 2022.

(30) Foreign Application Priority Data

Jun. 8, 2021 (KR) .................. 10-2021-0074104

(51) Int. Cl.
*H04N 23/52* (2023.01)
*H04N 23/51* (2023.01)
(Continued)

(52) U.S. Cl.
CPC ............. *H04N 23/52* (2023.01); *H04N 23/51* (2023.01); *H04N 23/54* (2023.01); *H04N 23/57* (2023.01)

(58) Field of Classification Search
CPC ........ H04N 23/50; H04N 23/51; H04N 23/52; H04N 23/54; H04N 23/57
See application file for complete search history.

(56) References Cited

U.S. PATENT DOCUMENTS 7,645,981 B2    1/2010   Tanaka et al.
7,980,773 B2    7/2011   Aoki et al.
(Continued)

FOREIGN PATENT DOCUMENTS

CN    102379039 A  *  3/2012  .......... H10F 39/804
KR    20060104962 A    10/2006
(Continued)

OTHER PUBLICATIONS

English translation of CN102379039A to Takeshita (Year: 2012).*
(Continued)

*Primary Examiner* — Daniel M Pasiewicz
(74) *Attorney, Agent, or Firm* — Nixon & Vanderhye, P.C.

(57) ABSTRACT

A camera module according to an embodiment may comprise: a printed circuit board including a first opening; a housing assembly comprising a housing arranged on a first surface of the printed circuit board; a first rear member comprising a plate arranged on a second surface of the printed circuit board, and arranged to overlap with the first opening and a part of the printed circuit board; a second rear member comprising a support arranged on the second surface of the printed circuit board and including a second opening in which the first rear member is arranged, and has a thickness thicker than a thickness of the first rear member; an image sensor arranged on one surface of the first rear member and exposed toward the housing assembly through the first opening; and at least one lens aligned to have the same optical axis of the image sensor, and arranged in the inner space of the housing assembly.

20 Claims, 13 Drawing Sheets

(51) Int. Cl.
*H04N 23/54* (2023.01)
*H04N 23/57* (2023.01)

(56) References Cited

U.S. PATENT DOCUMENTS

| | | |
|---|---|---|
| 7,990,470 B2 | 8/2011 | Lin et al. |
| 9,392,147 B2 | 7/2016 | Lee |
| 9,800,768 B2 | 10/2017 | Bae et al. |
| 10,194,066 B2 | 1/2019 | Jung et al. |
| 10,771,667 B2 | 9/2020 | Jung et al. |
| 11,418,687 B2 | 8/2022 | Kim et al. |
| 11,582,369 B2 * | 2/2023 | Ding .................. H04N 23/50 |
| 11,582,388 B2 | 2/2023 | Hubert et al. |
| 2007/0096234 A1 | 5/2007 | Tanaka et al. |
| 2009/0040368 A1 | 2/2009 | Lin et al. |
| 2011/0134314 A1 | 6/2011 | Lin et al. |
| 2016/0065801 A1 | 3/2016 | Bae et al. |
| 2019/0141248 A1 | 5/2019 | Hubert et al. |
| 2019/0149707 A1 | 5/2019 | Jung et al. |
| 2022/0247931 A1 | 8/2022 | Mahmoudzadeh et al. |
| 2023/0300437 A1 * | 9/2023 | Han .................. H04N 23/54 |
| | | 348/374 |

FOREIGN PATENT DOCUMENTS

| | | |
|---|---|---|
| KR | 20070047721 A | 5/2007 |
| KR | 20080049668 A | 6/2008 |
| KR | 20100095760 A | 9/2010 |
| KR | 20110010357 A | 2/2011 |
| KR | 20120053829 A | 5/2012 |
| KR | 20130022826 A | 3/2013 |
| KR | 20160026327 A | 3/2016 |
| KR | 20170030378 A | 3/2017 |
| KR | 101730270 B1 | 4/2017 |
| KR | 101872758 B1 | 7/2018 |
| KR | 20190110226 A | 9/2019 |
| KR | 20220018193 A | 2/2022 |
| KR | 20220162509 A | 12/2022 |

OTHER PUBLICATIONS

International Search Report for PCT/KR2022/008011 mailed Sep. 20, 2022, 5 pages.
Written Opinion of the ISA for PCT/KR2022/008011 mailed Sep. 20, 2022, 4 pages.
Korean Office Action issued Apr. 30, 2025 in corresponding Korean Patent Application No. 10-2021-0074104.

* cited by examiner

`US 12,556,787 B2`

CAMERA MODULE AND ELECTRONIC DEVICE COMPRISING SAME

CROSS-REFERENCE TO RELATED APPLICATIONS

This application is a continuation of International Application No. PCT/KR2022/008011 designating the United States, filed on Jun. 7, 2022, in the Korean Intellectual Property Receiving Office and claiming priority to Korean Patent Application No. 10-2021-0074104, filed on Jun. 8, 2021, in the Korean Intellectual Property Office, the disclosures of each of which are incorporated by reference herein in their entireties.

BACKGROUND

Field

The disclosure relates to a camera module and an electronic device including the same.

Description of Related Art

Typically, portable electronic devices are devices that allow users to access various content while the users are carrying such devices around and include electronic devices such as portable terminals, MP3 players, and PMPs, and these portable electronic devices are becoming more multifunctional according to consumer needs and size thereof is becoming increasingly smaller.

In particular, portable terminals are becoming multifunctional according to the various consumer needs due to their portability. In addition, with the recent technological development, portable terminals are being used as a multi-convergence not only for simple call functions, but also for functions such as music, movies, TV, and games. One of factors that are leading the development of these portable terminals into multi-convergence is the camera device (or camera module).

These camera devices are currently changing from the existing 300,000-pixel (VGA level) cameras to high-pixel cameras, and at the same time, being developed to implement various additional functions such as optical zoom, auto focus (AF), optical image stabilizer (OIS) (e.g., hand shake correction).

In general, camera devices (compact camera modules (CCM)) are small and applied to various IT devices such as mobile communication devices including camera phones, PDAs, and smartphones, and toy cameras, and in recent years, the release of devices equipped with small camera devices is gradually increasing to meet diverse tastes of consumers.

In general, a camera module may be seated to maintain a certain distance from a support member (e.g., a front case or rear case) inside an electronic device through a separate connection member (e.g., flange). However, when an external impact is applied to the electronic device, a collision may occur between the camera module and the support member of the electronic device, which may cause the impact to be transmitted to an image sensor of the camera module.

SUMMARY

Embodiments of the disclosure provide a camera module including a printed circuit board including an opening and an image sensor disposed in the opening, wherein the camera module includes a first back member disposed at a lower end of the printed circuit board and on which the image sensor is mounted and a second back member disposed to surround the first back member and formed to be thicker than the first back member.

According to an example embodiment of the disclosure, there is provided a camera module including: a printed circuit board including a first opening, a housing assembly comprising a housing disposed on a first surface of the printed circuit board, a first back member comprising a plate disposed on a second surface of the printed circuit board and disposed to overlap the first opening and a portion of the printed circuit board, a second back member comprising a support disposed on the second surface of the printed circuit board, including a second opening in which the first back member is disposed, the second back member being thicker than the first back member, an image sensor disposed on one surface of the first back member to be exposed toward the housing assembly through the first opening, and at least one lens disposed in an interior space of the housing and aligned to have the same optical axis as the image sensor.

According to an example embodiment of the disclosure, there is provided an electronic device including: a first plate, a second plate, and a camera module at least partially disposed in a space formed between the first plate and the second plate, wherein the camera module includes a printed circuit board including a first opening, a housing assembly including a housing disposed on a first surface of the printed circuit board, a first back member comprising a plate disposed on a second surface of the printed circuit board and disposed to overlap the first opening and a portion of the printed circuit board, a second back member comprising a support disposed on the second surface of the printed circuit board, including a second opening in which the first back member is disposed, wherein the second back member is thicker than the first back member, an image sensor disposed on one surface of the first back member to be exposed toward the housing assembly through the first opening, and at least one lens disposed in an interior space of the housing assembly to be aligned to have the same optical axis as the image sensor.

According to various example embodiments disclosed herein, in a camera module including a printed circuit board including an opening and an image sensor disposed in the opening, the image sensor can be mounted on a first back member, and a second back member protruding from the first back member can be in contact with a support member of an electronic device, thereby decreasing the amount of impact transmitted to the image sensor when an external impact is applied to the electronic device.

Besides, various effects may be provided that are directly or indirectly identified through the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments will be described with reference to the accompanying drawings. However, this is not intended to limit the various embodiments disclosed herein to specific embodiments, and it is to be understood to include various modifications, equivalents, and/or alternatives of embodiments of the disclosure.

Figure 1:
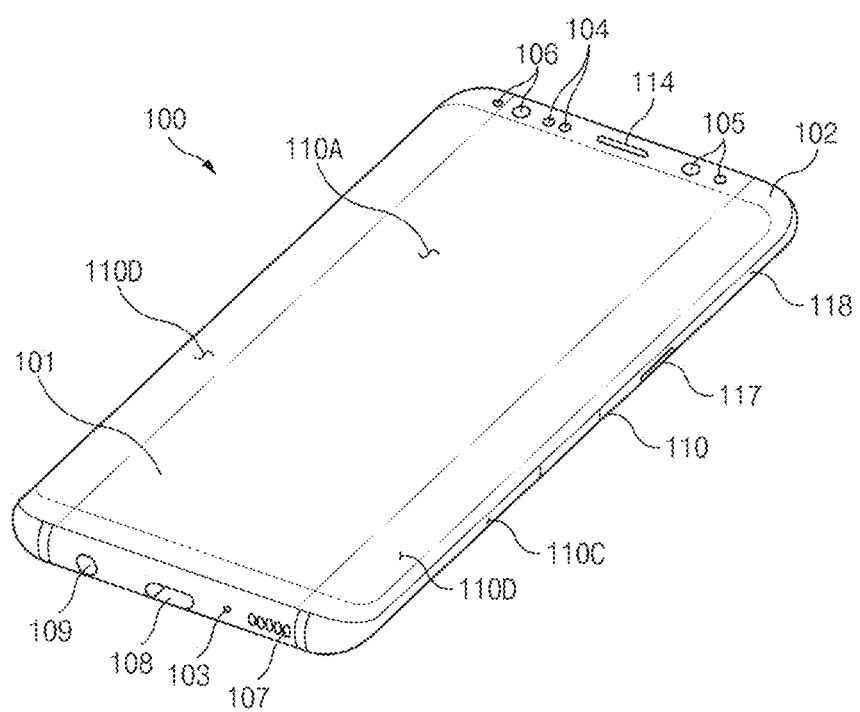
FIG. 1 is a front perspective view of an example mobile electronic device according to various embodiments.
Figure 2:
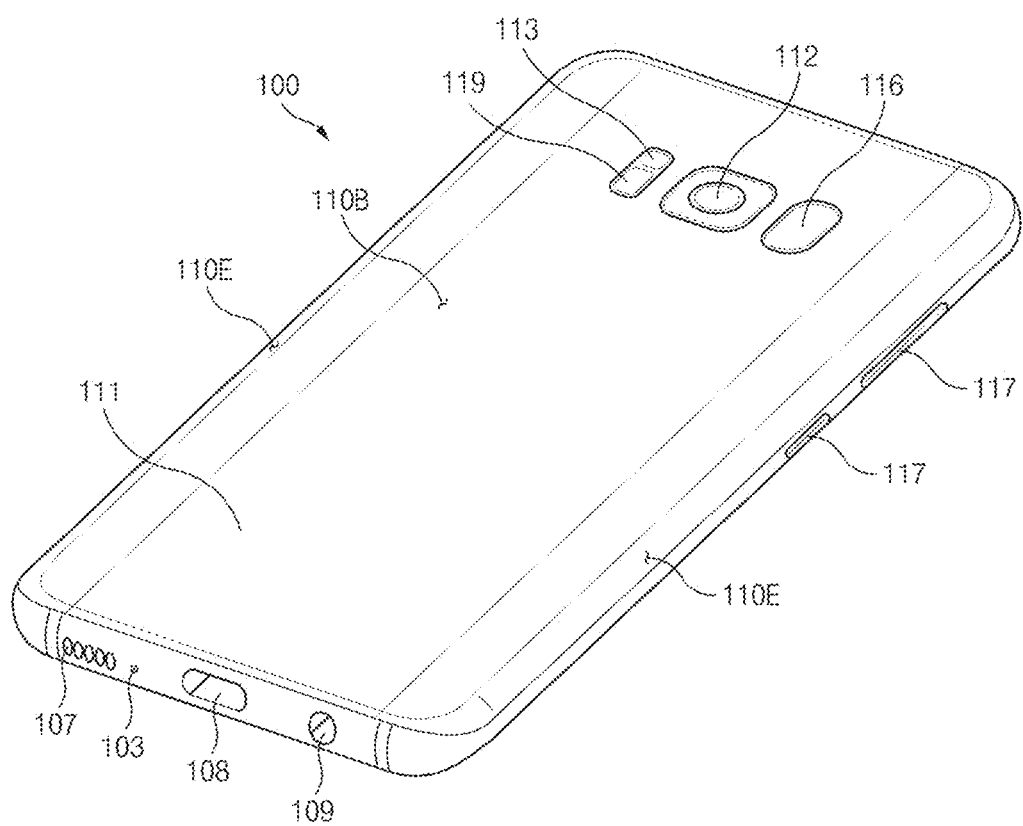
FIG. 2 is a rear perspective view of the electronic device of FIG. 1 according to various embodiments.
Figure 3:
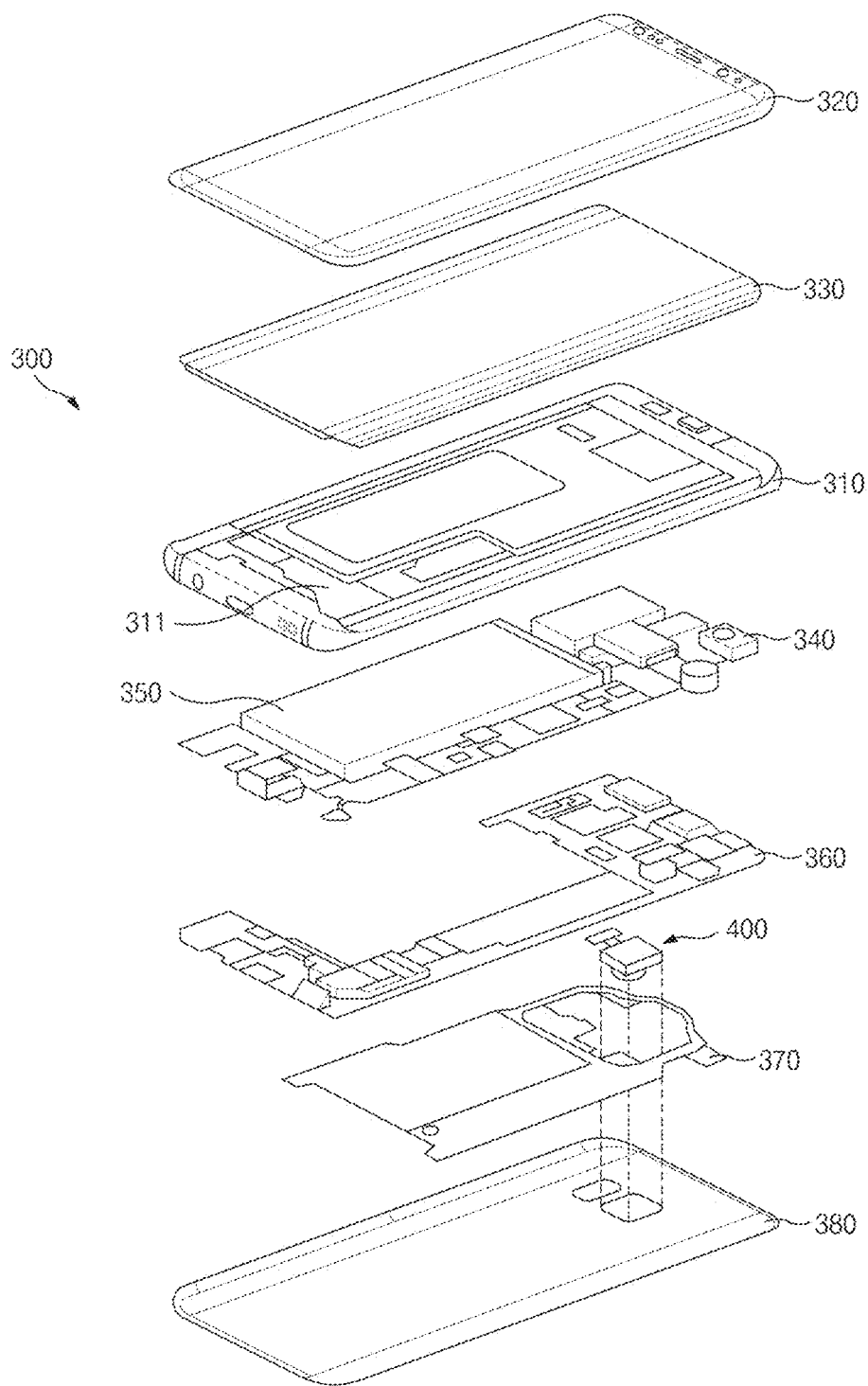
FIG. 3 is an exploded perspective view of the electronic device of FIG. 1 according to various embodiments.

FIG. 1 is a front perspective view of an example mobile electronic device according to various embodiments. FIG. 2 is a rear perspective view of the electronic device of FIG. 1 according to various embodiments. FIG. 3 is an exploded perspective view of the electronic device of FIG. 1 according to various embodiments.

Referring to FIGS. 1 and 2, an electronic device 100 according to an embodiment may include a housing 110 including a first surface (or front surface) 110A, a second surface (or back surface) 110B, and a side surface 110C surrounding a space between the first surface 110A and the second surface 110B. In an embodiment (not illustrated), the housing may refer to a structure forming some of the first surface 110A, the second surface 110B, and the side surface 110C of FIG. 1. According to an embodiment, the first surface 110A may be formed by a front plate 102 (e.g., a glass plate or a polymer plate including various coating layers) that is at least partially substantially transparent. The second surface 110B may be formed by a back plate 111 that is substantially opaque. The back plate 111 may be formed, for example, by coated or colored glass, ceramic, polymer, metal (e.g., aluminum, stainless steel (STS), or magnesium), or a combination of at least two of the above materials. The side surface 110C may be coupled with the front plate 102 and the back plate 111, and may be formed by a side bezel structure (or "side member") 118 that includes metal and/or polymer. In various embodiments, the back plate 111 and the side bezel structure 118 may be integrally formed, and may include the same material (e.g., a metal material such as aluminum).

In the illustrated embodiment, the front plate 102 may include two first regions 110D that are curved from the first surface 110A toward the back plate 111 and extend seamlessly at both long edges of the front plate 102. In the illustrated embodiment (see FIG. 2), the back plate 111 may include two second regions 110E that are curved from the second surface 110B toward the front plate 102 and extend seamlessly at the both long edges. In various embodiments, the front plate 102 (or the back plate 111) may include only one of the first regions 110D (or the second regions 110E). In an embodiment, some of the first regions 110D or the second regions 110E may not be included. In various embodiments, when viewed from the side of the electronic device 100, the side bezel structure 118 may have a first thickness (or width) on the sides where the first regions 110D or the second regions 110E as described above are not included, and may have a second thickness thinner than the first thickness on the sides where the first regions 110D or the second regions 110E are included.

According to an embodiment, the electronic device 100 may include at least one of a display 101, audio modules 103, 107, and 114, sensor modules 104, 116, and 119, camera modules 105, 112, and 113, key input devices 117, a light emitting device 106, and connector holes 108 and 109. In various embodiments, the electronic device 100 may omit at least one of the components (e.g., the key input devices 117 or the light emitting device 106), or may additionally include other components.

The display 101 may be visible through a significant portion of the front plate 102, for example. In various embodiments, at least a portion of the display 101 may be visible through the front plate 102 forming the first surface 110A and the first regions 110D of the side surface 110C. In various embodiments, an edge of the display 101 may be formed to be substantially the same as the shape of the outer edge of the front plate 102 adjacent to the edge. In an embodiment (not illustrated), in order to expand the area where the display 101 is visible, distances between the outer edges of the display 101 and the outer edges of the front plate 102 may be formed to be substantially the same as each other.

In an embodiment (not illustrated), in a portion of a screen display region of the display 101, a recess or opening may be formed, and at least one of the audio module 114, the sensor module 104, the camera module 105, and the light emitting device 106, which are aligned with the recess or the opening, may be included. In an embodiment (not illustrated), on the back of the screen display region of the display 101, at least one of the audio module 114, the sensor module 104, the camera module 105, a fingerprint sensor 116, and the light emitting device 106 may be included. In an embodiment (not illustrated), the display 101 may be coupled with or disposed adjacent to a touch sensing circuit, a pressure sensor capable of measuring the intensity (pressure) of the touch, and/or a digitizer detecting a magnetic field type stylus pen. In various embodiments, at least some of the sensor modules 104 and 119, and/or at least some of the key input devices 117 may be disposed on the first regions 110D and/or the second regions 110E.

The audio modules 103, 107, and 114 may include a microphone hole 103 and speaker holes 107 and 114. In the microphone hole 103, a microphone for acquiring external sound may be disposed therein, and in various embodiments, a plurality of microphones may be disposed to sense the direction of sound. The speaker holes 107 and 114 may include an external speaker hole 107 and a call receiver hole 114. In various embodiments, the speaker holes 107 and 114 and the microphone hole 103 may be implemented as one hole, or a speaker may be included without the speaker holes 107 and 114 (e.g., a piezo speaker).

The sensor modules 104, 116, and 119 may generate an electrical signal or data value corresponding to an internal operational state or an external environmental state of the electronic device 100. The sensor modules 104, 116, and 119 may include, for example, a first sensor module 104 (e.g., a proximity sensor) and/or a second sensor module (not illustrated) (e.g., the fingerprint sensor) disposed on the first surface 110A of the housing 110, and/or a third sensor module 119 (e.g., an HRM sensor) and/or a fourth sensor module 116 (e.g., the fingerprint sensor) disposed on the second surface 110B of the housing 110. The fingerprint sensor may be disposed on the second surface 110B as well as the first surface 110A (e.g., the display 101) of the housing 110. The electronic device 100 may further include a sensor module which is not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera module 105 disposed on the first surface 110A of the electronic device 100, and a second camera module 112 and/or a flash 113 disposed on the second surface 110B. The camera modules 105 and 112 may include one or more lenses, an image sensor, and/or an image signal processor. The flash 113 may include, for example, a light emitting diode or a xenon lamp. In various embodiments, two or more lenses (infrared camera, wide-angle and telephoto lenses) and image sensors may be disposed on one surface of the electronic device 100.

The key input devices 117 may be disposed on the side surface 110C of the housing 110. In an embodiment, the electronic device 100 may not include some or all of the key input devices 117 mentioned above, and the key input device(s) 117, which is (are) not included, may be implemented in other forms, such as a soft key, on the display 101. In various embodiments, the key input device may include the sensor module 116 disposed on the second surface 110B of the housing 110.

The light emitting device 106 may be disposed on the first surface 110A of the housing 110, for example. The light emitting device 106 may provide, for example, state information about the electronic device 100 in the form of light. In an embodiment, the light emitting device 106 may provide, for example, a light source in conjunction with the operation of the camera module 105. The light emitting device 106 may include, for example, an LED, an IR LED, and a xenon lamp.

The connector holes 108 and 109 may include a first connector hole 108 capable of accommodating a connector (for example, a USB connector) for transmitting and receiving electric power and/or data to and from an external electronic device, and/or a second connector hole 109 (e.g., an earphone jack) capable of accommodating a connector for transmitting and receiving audio signals to and from an external electronic device.

Referring to FIG. 3, the electronic device 300 may include a side bezel structure 310, a first support member 311 (e.g., a bracket), a front plate 320, a display 330, a printed circuit board 340 (e.g., a printed circuit board (PCB), a printed board assembly (PBA), a flexible PCB (FPCB), or a rigid-flexible PCB (RFPCB)), a battery 350, a second support member 360 (e.g., a rear case), an antenna 370, a back plate 380, and a camera module 400. In various embodiments, the electronic device 300 may omit at least one of the components (e.g., the first support member 311 or the second support member 360), or may additionally include other components. At least one of the components of the electronic device 300 may be the same as or similar to at least one of the components of the electronic device 100 of FIG. 1 or FIG. 2, and the description thereof will not be repeated below.

The first support member 311 may be disposed inside the electronic device 300 to be connected to the side bezel structure 310 or may be integrally formed with the side bezel structure 310. The first support member 311 may be formed of, for example, a metal material and/or a non-metal (e.g., polymer) material. The first support member 311 may have the display 330 coupled to one surface and the printed circuit board 340 coupled to the other surface. The printed circuit board 340 may be equipped with a processor, a memory, and/or an interface. The processor may include various processing circuitry (as used herein, including the claims, the term "processor" may include various processing circuitry, including at least one processor, wherein one or more processors of at least one processor may be configured to perform the various functions described herein), for example, the processor may include one or more of a central processing unit, an application processor, a graphic processing unit, an image signal processor, a sensor hub processor, or a communication processor.

The memory may include, for example, a volatile memory or a non-volatile memory.

The interface may include, for example, a high-definition multimedia interface (HDMI), a universal serial bus (USB) interface, a secure digital (SD) card interface, and/or an audio interface. The interface may electrically or physically connect the electronic device 300 to an external electronic device, for example, and may include a USB connector, an SD card/MMC connector, or an audio connector.

The battery 350 may be a device for supplying electric power to at least one of the components of the electronic device 300, and may include, for example, a primary cell which is not rechargeable, a secondary cell which is rechargeable, or a fuel cell. At least a portion of the battery 350 may be disposed, for example, on substantially the same plane as the printed circuit board 340. The battery 350 may be integrally disposed inside the electronic device 300, or may be disposed to be detachable from the electronic device 300.

The antenna 370 may be disposed between the back plate 380 and the battery 350. The antenna 370 may include, for example, a near field communication (NFC) antenna, a wireless charging antenna, and/or a magnetic secure transmission (MST) antenna. The antenna 370 may, for example, perform short range communication with an external device, or may wirelessly transmit and receive electric power required for charging. In an embodiment, an antenna structure may be formed by the side bezel structure 310 and/or a portion of the first support member 311 or a combination thereof.

According to an embodiment, the camera module 400 (e.g., the second camera module 112 in FIG. 2) may be disposed between the second support member 360 and the back plate 380 (e.g., the back plate 111 in FIG. 2). For example, the camera module 400 may be displaced in an opening formed in a portion of the back plate 380 so that the lens is visually exposed to the outside. As another example (not illustrated), the camera module 400 (e.g., the first camera module 105 in FIG. 1) may be disposed between the first support member 311 and the front plate 320 (e.g., the front plate 102 in FIG. 1). The camera module 400 may be disposed so that the lens is visually exposed to the outside through a portion of the front plate 320.

Figure 4:
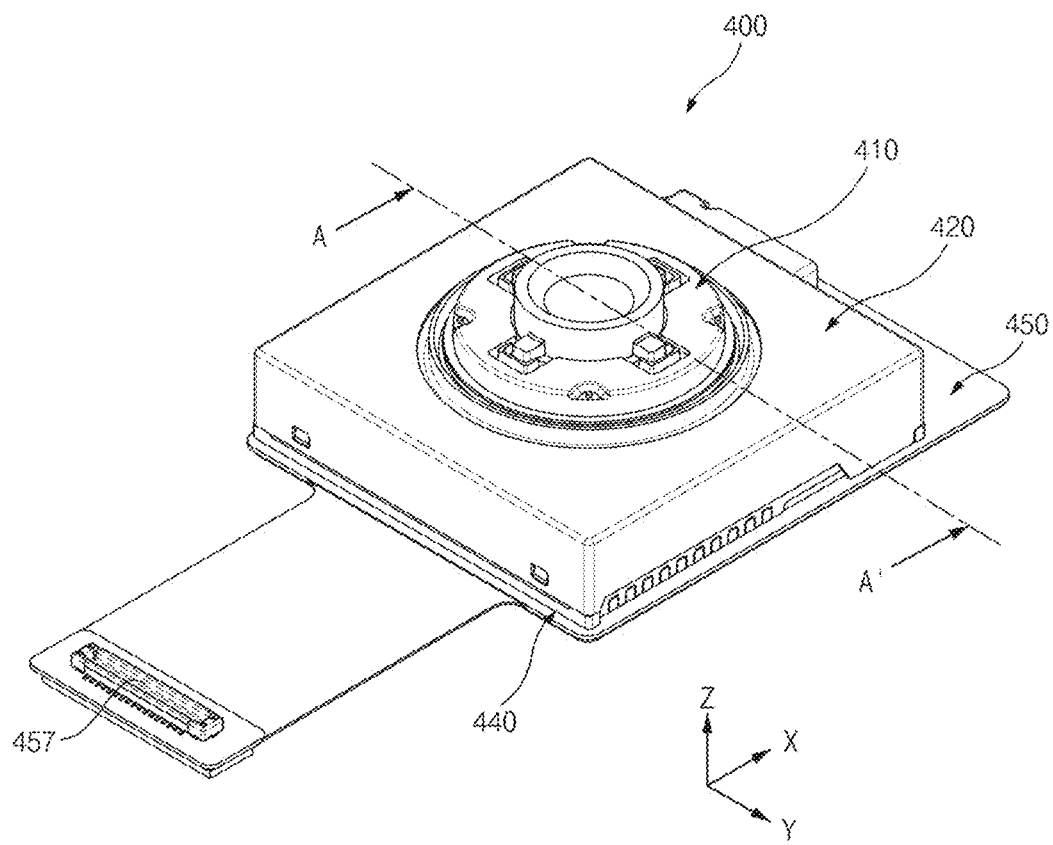
FIG. 4 is a top perspective view of a camera module according to various embodiments.
Figure 5:
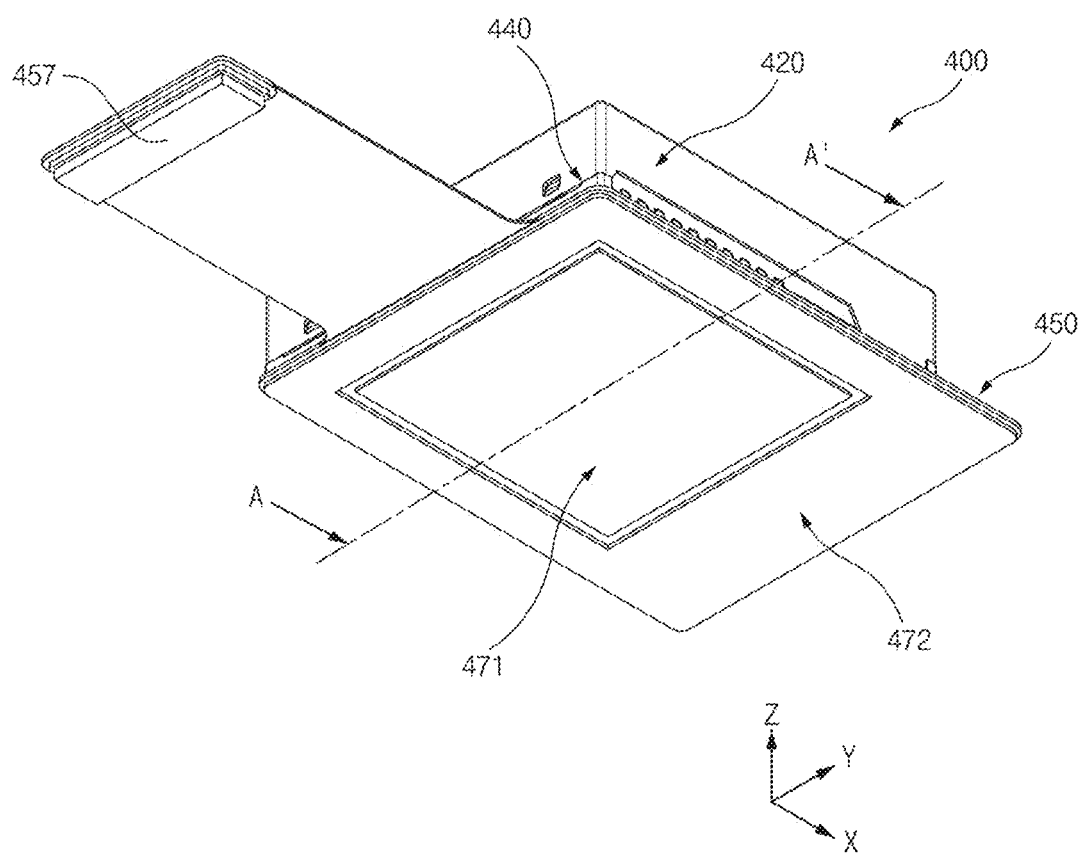
FIG. 5 is a bottom perspective view of the camera module of FIG. 4 according to various embodiments.
Figure 6:
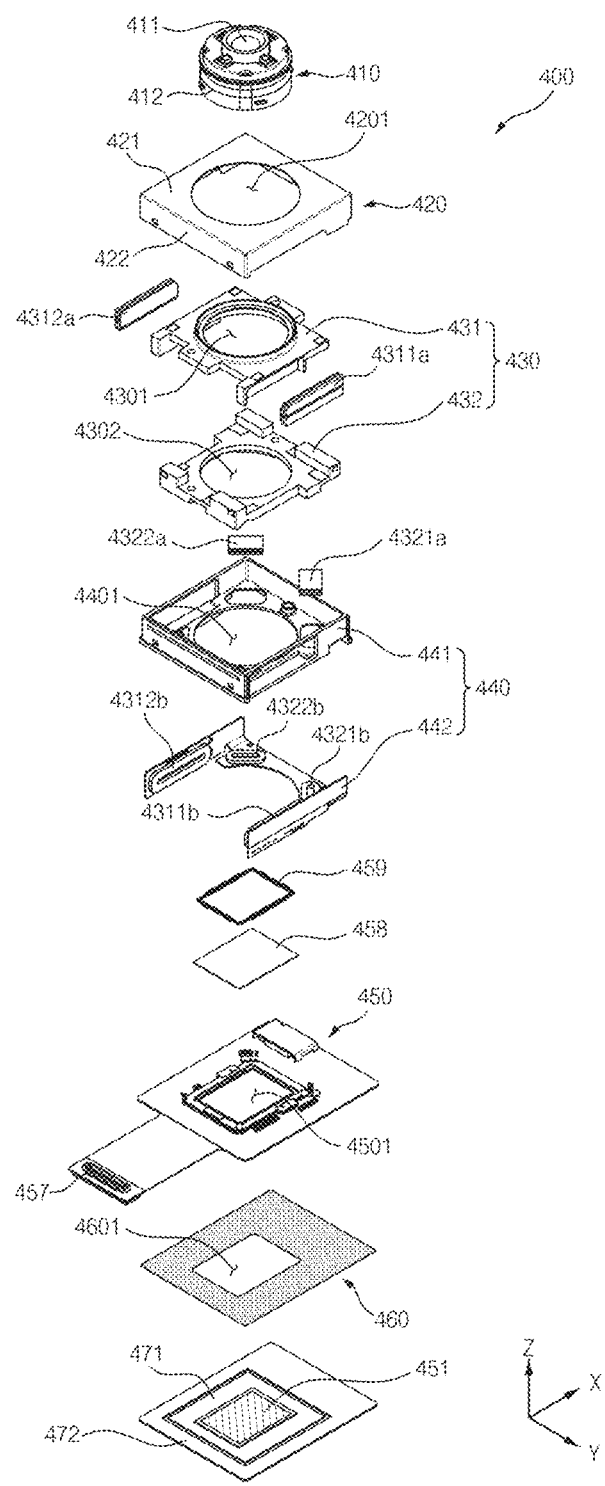
FIG. 6 is an exploded perspective view illustrating the camera module of FIG. 4 according to various embodiments.
Figure 7:
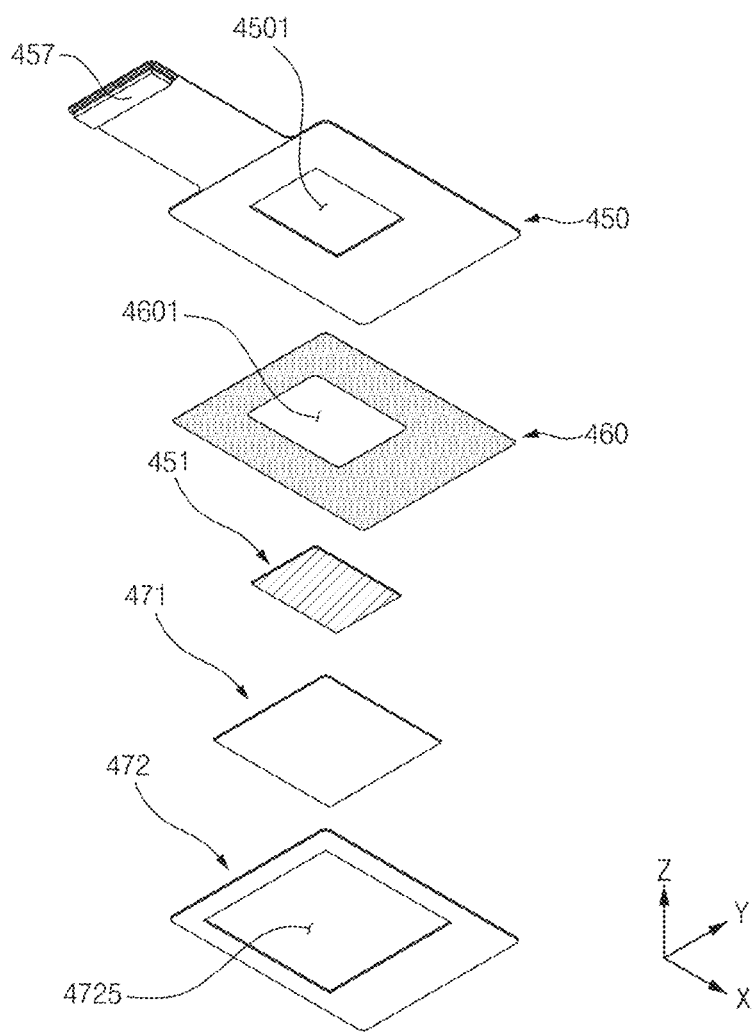
FIG. 7 is an exploded perspective view illustrating a relationship between a printed circuit board, a first back member, and a second back member in the camera module of FIG. 4 according to various embodiments.

FIG. 4 is a top perspective view of the camera module 400 according to various embodiments. FIG. 5 is a bottom perspective view of the camera module 400 of FIG. 4 according to various embodiments. FIG. 6 is an exploded perspective view illustrating the camera module 400 of FIG. 4 according to various embodiments. FIG. 7 is an exploded perspective view illustrating a relationship between a printed circuit board, a first back member, and a second back member in the camera module 400 of FIG. 4 according to various embodiments.

Referring to FIGS. 4, 5, 6 and 7, the camera module 400 may include a lens assembly 410, a shield can 420, a carrier assembly 430, a housing assembly 440, a printed circuit board 450, and an image sensor 451, an adhesive member 460, a first back member 471, and a second back member 472.

According to an embodiment, the lens assembly 410 may include a lens 411 and a lens barrel 412. For example, the lens 411 may collect light incident from the outside and transmit the collected light to the image sensor 451 disposed below the lens barrel 412. This lens 411 may include one or multiple lenses. The lens 411 may be fixed to one side of the lens barrel 412. The lens barrel 412 may surround the seated lens 411 and provide an optical path allowing light incident through the lens 411 to be transmitted to the image sensor 451. In this regard, the center portion of the lens barrel 412 may be empty, and the upper and lower portions may be open to expose at least a portion of the image sensor 451. The upper side of the lens barrel 412 may be provided in a shape corresponding to a shape of the lens 411. The lens barrel 412 may be at least partially seated and fixed inside the carrier assembly 430. Accordingly, the lens assembly 410 (or the lens barrel 412 and the lens 411) may be moved with movement of the carrier assembly 430.

According to an embodiment, the shield can 420 may be provided in a form that covers the camera module 400 from top to bottom as a whole. For example, the shield can 420 may include an upper surface 421 and shield can sidewalls 422 disposed at edges of the upper surface 421, and a lower surface thereof may be provided in an open form. A first opening 4201 having a predetermined size may be provided in the upper surface 421 of the shield can 420 so that at least a portion of the lens assembly 410 is exposed. The shield can sidewalls 422 may be fastened to edges of the housing assembly 440 (or a housing 441) to serve to protect or fix components seated therein (e.g., the lens assembly 410, the carrier assembly 430, and the housing assembly 440). The shield can 420 may be made of, for example, a metal material or a material (e.g., reinforced plastic) having a hardness greater than or equal to a specified level.

According to an embodiment, the carrier assembly 430 may include a first carrier 431 (e.g., an auto focusing (AF) carrier) and a second carrier 432 (e.g., an optical image stabilizer (OIS) carrier). For example, the first carrier 431 and the second carrier 432 may be provided to be hollow on the inside so that the lens barrel 412 is disposed. As one example, the first carrier 431 may include a second opening 4301 at the center. The second carrier 432 may include a third opening 4302 at the center. A first magnet member 4311*a* and a second magnet member 4312*a* (e.g., magnet members for autofocus correction) may be disposed on at least two outer sides of the first carrier 431. As one example, the first magnet member 4311*a* and the second magnet member 4312*a* may be respectively disposed on two outer sides of the first carrier 431 that are not adjacent to each other. A third magnet member 4321*a* and a fourth magnet member 4322*a* (e.g., magnet members for hand shake correction) may be disposed on at least two edges of a bottom surface of the second carrier 432. As one example, the third magnet member 4321*a* and the fourth magnet member 4322*a* may be respectively disposed on two adjacent edges of the bottom surface of the second carrier 432.

According to an embodiment, the housing assembly 440 may include the housing 441 and a flexible circuit board 442 (e.g., a flexible printed circuit board (FPCB)). For example, a first coil 4311*b* and a second coil 4312*b* (e.g., coils for autofocus correction) may be attached to be electrically connected to the flexible circuit board 442. The first coil 4311*b* may be positioned on one surface of the housing 441 (e.g., a surface facing a +Y-axis direction) while being attached to one region of the flexible circuit board 442 to face the first magnet member 4311*a*. The second coil 4312*b* may be positioned on another surface of the housing 441 (e.g., a surface facing a −Y-axis direction) while being attached to another region of the flexible circuit board 442 to face the second magnet member 4312*a*. The flexible circuit board 442 may be disposed to surround at least a portion of the side surface of the housing 441 (e.g., the side facing a Y-axis direction) with the first coil 4311*b* and the second coil 4312*b* attached.

According to an embodiment, a third coil 4321*b* and a fourth coil 4322*b* (e.g., coils for hand shake correction) may be attached to be electrically connected to the flexible circuit board 442. For example, the third coil 4321*b* may be disposed at one edge of a bottom surface of the housing 441 to face the third magnet member 4321*a*. The fourth coil 4322*b* may be disposed at another edge of the bottom surface of the housing 441 to face the fourth magnet member 4322*a*. The housing 441 may include a fourth opening 4401 so that the image sensor 451 is exposed toward the lens assembly 410.

According to an embodiment, the carrier assembly 430 may be accommodated inside the housing 441. For example, in the housing 441, the first carrier 431 may be disposed on the second carrier 432. The first carrier 431 may be moved in an optical axis direction (e.g., a Z-axis direction) of the lens 411 in the housing 441. The second carrier 432 may be moved in the housing 441 on a plane perpendicular to an optical axis of the lens 411 (e.g., in an X-axis direction or Y-axis direction). The lens assembly 410 may be inserted into and fixed to openings (e.g., the second opening 4301 and the third opening 4302) of the carrier assembly 430. For automatic focus control or hand shake correction, the lens assembly 410 may be moved in the X-axis direction, the Y-axis direction, or the Z-axis direction with the movement of the carrier assembly 430.

According to an embodiment, the camera module 400 may perform an AF operation through the first carrier 431. For example, the flexible circuit board 442 may be electrically connected to the printed circuit board 450. The printed circuit board 450 may be connected to at least one processor (e.g., a first processor related to driving of the camera module 400 or a second processor related to control of electronic devices 100 and 300) through a connector 457. The printed circuit board 450 may be connected to the connector 457 through a flexible printed circuit board (FPCB). The connector 457 may be electrically connected to the main circuit board (e.g., a printed circuit board 340) on which the processor is mounted. The processor may supply specified signals to the first coil 4311b and the second coil 4312b through the printed circuit board 450 and the flexible circuit board 442. When the specified signal is supplied to the first coil 4311b and the second coil 4312b, the first magnet member 4311a and the second magnet member 4312a may move forward and backward along the optical axis direction (e.g., the Z-axis direction) of the lens 411. The first carrier 431 may be moved by the movement of the first magnet member 4311a and the second magnet member 4312a, and the lens assembly 410 may move forward and backward along the optical axis direction of the lens 411.

According to an embodiment, the camera module 400 may perform an OIS operation through the second carrier 432. For example, the processor may supply specified signals to the third coil 4321b and the fourth coil 4322b through the printed circuit board 450 and the flexible circuit board 442. When the specified signal is supplied to the third coil 4321b and the fourth coil 4322b, the third magnet member 4321a and the fourth magnet member 4322a may be moved on a plane perpendicular to the optical axis of the lens 411 (e.g., the X-axis direction, the Y-axis direction, or a plane parallel to the image sensor 451). The second carrier 432 may be moved by movement of the third magnet member 4321a and the fourth magnet member 4322a, and the lens assembly 410 may be moved on a plane substantially perpendicular to the optical axis of the lens 411.

According to an embodiment, at least two back members may be disposed below the printed circuit board 450. For example, the housing assembly 440 may be disposed on a first surface (e.g., an upper surface or a surface facing the lens assembly 410) of the printed circuit board 450. The first back member 471 and the second back member 472 may be disposed on a second surface (e.g., the surface opposite to the first surface) of the printed circuit board 450. The printed circuit board 450 may include a fifth opening 4501 at the center. The adhesive member 460 may include a sixth opening 4601 at the center. The size of the sixth opening 4601 may be greater than or equal to the size of the fifth opening 4501. As one example, the first back member 471 and the second back member 472 may be attached to the printed circuit board 450 through the adhesive member 460. As another example (not illustrated), the first back member 471 and the second back member 472 may be attached to the printed circuit board 450 through a specified attachment method (e.g., a surface mount device (SMD) method).

According to an embodiment, the first back member 471 may be disposed such that a portion of the first back member 471 overlaps the printed circuit board 450 and the fifth opening 4501. The image sensor 451 may be mounted on the first back member 471 to face the lens assembly 410. The image sensor 451 may be disposed in the fifth opening 4501.

According to an embodiment, the second back member 472 may include a seventh opening 4725. For example, the first back member 471 may be formed to be smaller than the seventh opening 4725, and may be disposed in the seventh opening 4725. The first back member 471 may be spaced apart from the second back member 472 by a specified distance. The second back member 472 may be formed to be thicker than the first back member 471.

According to an embodiment, a filter 458 (an infrared ray (IR) filter) may be disposed between the image sensor 451 and the lens assembly 410. For example, the image sensor 451 and the filter 458 may be aligned to have the same optical axis as the at least one lens 411. The filter 458 may be fixed to the first surface of the printed circuit board 450 through a fixing member 459.

Figure 8:
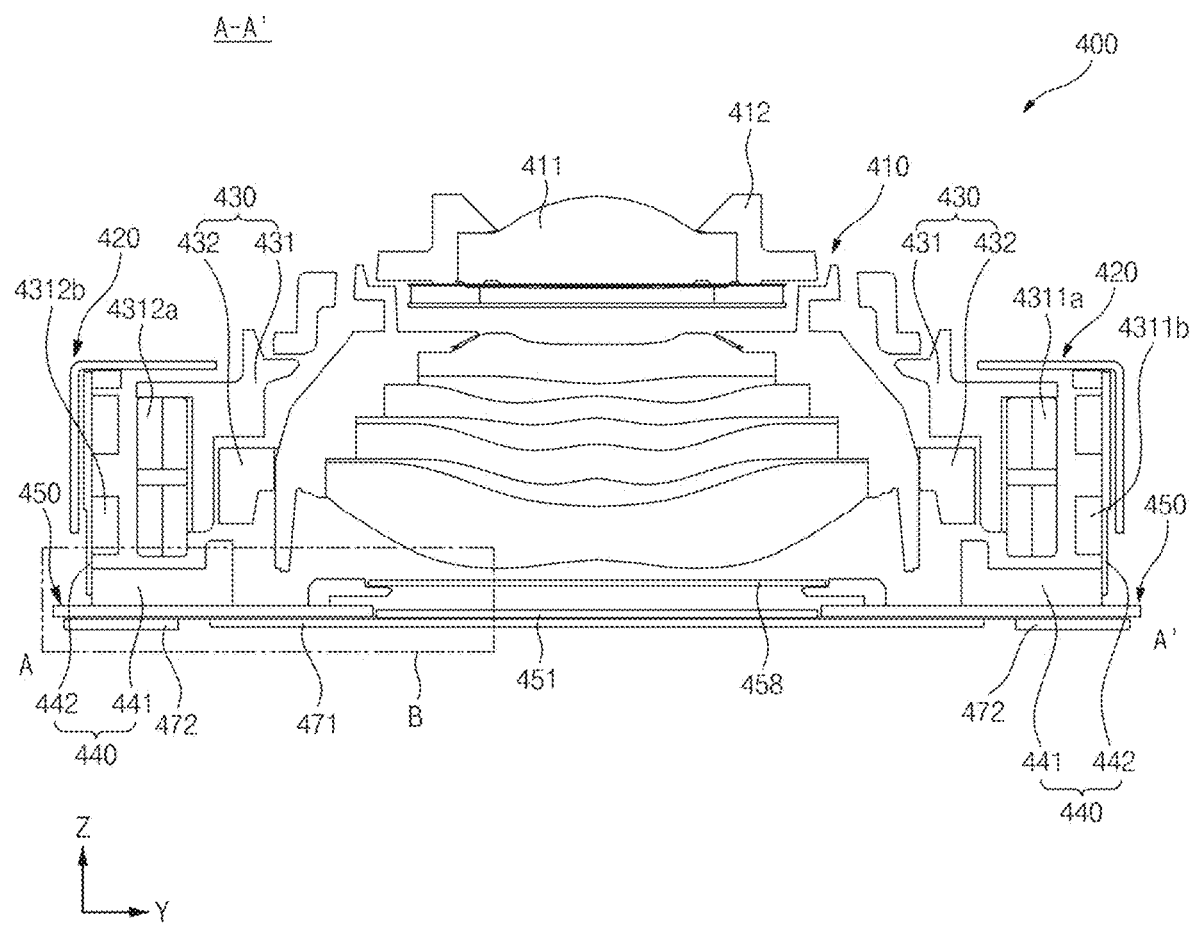
FIG. 8 is a cross-sectional view taken along A-A' of the camera module of FIG. 4 according to various embodiments.
Figure 9:
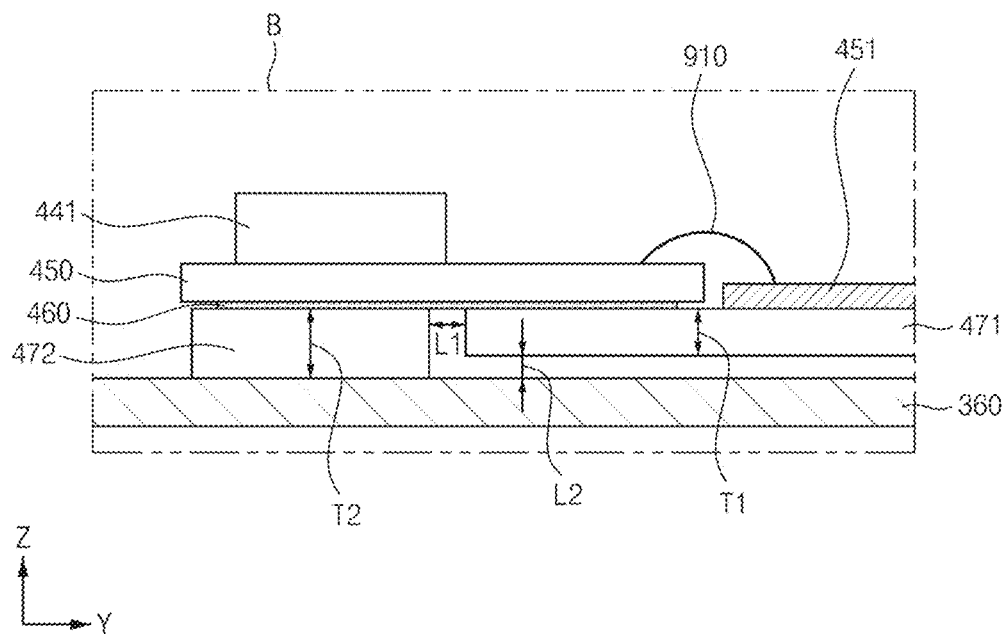
FIG. 9 is a partial cross-sectional view illustrating an example in which part B of FIG. 8 is enlarged according to various embodiments.

FIG. 8 is a cross-sectional view taken along A-A' of the camera module 400 of FIG. 4 according to various embodiments. FIG. 9 is a partial cross-sectional view illustrating an example in which part B of FIG. 8 is enlarged according to various embodiments.

For convenience of description, FIG. 9 may be a view in which some (e.g., components such as the lens assembly 410, the second magnet member 4312a, the second coil 4312b, the flexible circuit board 442, the filter 458, or a filter holder) of the components of the camera module 400 are omitted. In addition, FIG. 9 may be a view in which the second support member 360 is illustrated together to describe the relationship between the camera module 400 and the second support member (e.g., the second support member 360 in FIG. 3).

Referring to FIGS. 6, 7, 8 and 9, the housing assembly 440 may be disposed on the first surface (or upper side surface) of the printed circuit board 450 (e.g., the surface facing the lens assembly 410). The first back member 471 and the second back member 472 may be disposed on the second surface (or lower side surface) of the printed circuit board 450 (e.g., the surface opposite to the first surface). The image sensor 451 may be attached to the first back member 471 to face the lens assembly 410 (or the lens 411). The image sensor 451 may be electrically connected to the printed circuit board 450 through at least one wire bonding 910.

According to an embodiment, the first back member 471 and the second back member 472 may be attached to the second surface of the printed circuit board 450. As one example, the first back member 471 and the second back member 472 may be attached through one adhesive member 460. One surface of the adhesive member 460 may be attached to the second surface of the printed circuit board 450. The first back member 471 may be attached to a portion of another surface of the adhesive member 460. The second back member 472 may be attached to another portion of the other surface of the adhesive member 460. As another example (not illustrated), each of the first back member 471 and the second back member 472 may be attached to the second surface of the printed circuit board 450 through different adhesive members. The first back member 471 may be attached to a portion of the second surface of the printed circuit board 450 through a first sub-adhesive member. The second back member 472 may be attached to another portion of the second surface of the printed circuit board 450 through a second sub-adhesive member. As yet another example (not illustrated), each of the first back member 471 and the second back member 472 may be attached to the second surface of the printed circuit board 450 through a specified attachment method (e.g., an SMD method).

According to an embodiment, the first back member 471 and the second back member 472 may be attached to the printed circuit board 450 while being spaced apart by a specified distance. For example, the first back member 471 and the second back member 472 may be disposed to be spaced apart by a first length L1.

According to an embodiment, the first back member 471 and the second back member 472 may form a specified step. For example, the first back member 471 may be formed to have a first thickness T1. The second back member 472 may be formed to have a second thickness T2 greater than the first thickness T1. As an example, when the camera module 400 is mounted on the electronic device (e.g., the electronic device 100 or 300), the second back member 472 may contact the second support member 360 (e.g., the front case or the rear case) of the electronic device, and the first back member 471 may be disposed to be spaced apart from the second support member 360 of the electronic device by a second length L2. For example, the second back member 472 may support the camera module 400 instead of the flange.

According to an embodiment, when an external impact is applied to the electronic device (e.g., when the electronic device falls or the electronic device collides somewhere), the external impact may be absorbed or distributed to the printed circuit board 450 and the housing 441 through the second back member 472. The amount of impact transmitted to the first back member 471 may be reduced compared with when the first back member 471 and the second back member 472 are integrally formed or when the first back member 471 is in contact with the second support member 360 of the electronic device. Accordingly, the amount of impact transmitted to the image sensor 451 due to the external impact may be reduced.

According to an embodiment, the first back member 471 may be formed to have a specified flatness. For example, the first back member 471 may include a metal plate including a flat surface having the specified flatness. The first back member 471 may be disposed so that the flat surface faces the printed circuit board 450. The image sensor 451 may be mounted on the flat surface. The image sensor 451 may be mounted on the first back member 471 having a flatness and disposed to be aligned with the optical axis of the lens (e.g., lens 411) regardless of the second back member 472.

According to an embodiment, the first back member 471 and the second back member 472 may be formed of the same material. As one example, the first back member 471 may include a metal plate including a flat surface having a specified flatness. The second back member 472 may be formed of a metal plate made of the same material as the first back member 471.

According to an embodiment, the second back member 472 may be formed of a different material from the first back member 471. As one example, the second back member 472 may be formed of a shock absorbing material (e.g., an elastic material). Accordingly, when an external impact is applied to the electronic device, the second back member 472 may alleviate the impact.

Figure 10A:
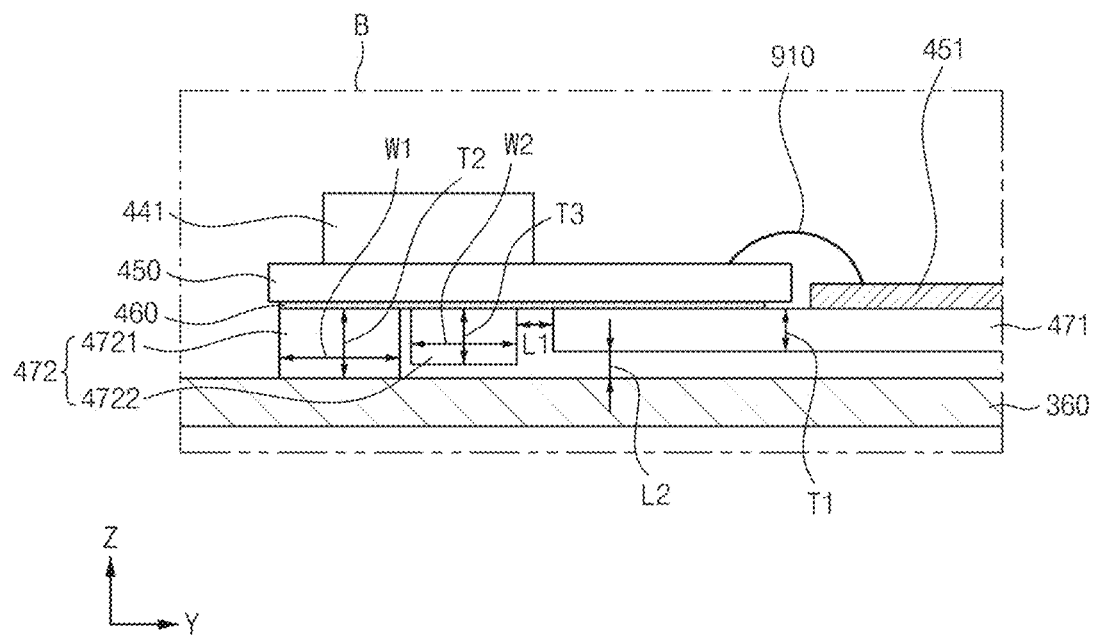
FIG. 10A is a partial cross-sectional view illustrating another example in which part B of FIG. 8 is enlarged according to various embodiments.
Figure 10B:
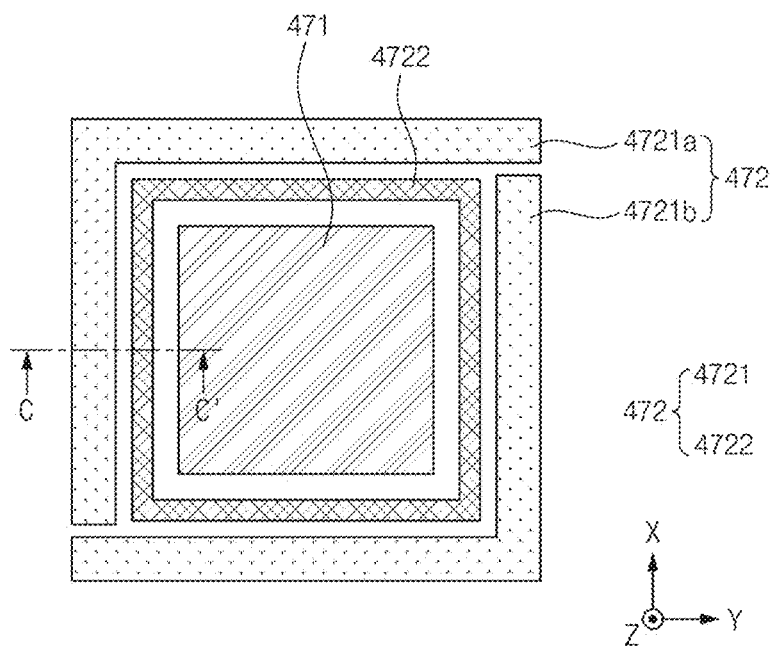
FIG. 10B is a diagram illustrating a relationship between the first back member and the second back member in FIG. 10A according to various embodiments.

FIG. 10A is a partial cross-sectional view illustrating an example in which part B of FIG. 8 is enlarged according to various embodiments. FIG. 10B is a diagram illustrating a relationship between the first back member 471 and the second back member 472 in FIG. 10A according to various embodiments.

For convenience of description, FIG. 10A may be a view in which some (e.g., components such as the lens assembly 410, the second magnet member 4312a, the second coil 4312b, the flexible circuit board 442, the filter 458, or a filter holder) of the components of the camera module 400 are omitted. In addition, FIG. 10a may be a view in which the second support member 360 is illustrated together to describe the relationship between the camera module 400 and the second support member (e.g., the second support member 360 in FIG. 3). In FIG. 10a, the first back member 471 and the second back member 472 may be understood as having a cross section taken along line C-C' of FIG. 10b.

Referring to FIGS. 10A and 10B, the second back member 472 may include a plurality of sub-back members. For example, the second back member 472 may include a first sub-back member 4721 and a second sub-back member 4722. The first sub-back member 4721 may be disposed to at least partially surround the second sub-back member 4722.

For example, as illustrated in FIG. 10B, when the image sensor 451 is viewed from above (e.g., in a +Z-axis direction), the first back member 471 may be positioned inside the second sub-back member 4722, and the second sub-back member 4722 may be positioned inside the first sub-back member 4721. According to the illustrated embodiment, the first sub-back member 4721 may include a 1-1 sub-back member 4721a and a 1-2 sub-back member 4721b separated from each other to at least partially surround the second sub-back member 4722.

For example, the 1-1 sub-back member 4721a may be configured to surround a +X-axis direction edge and a −Y-axis direction edge of the second sub-back member 4722, and the 1-2 sub-back member 4721b may be configured to surround a +Y-axis direction edge and a −X-axis direction edge of the second sub-back member 4722. Each of the 1-1 sub-back member 4721a and the 1-2 sub-back member 4721b may be formed in a shape where one part and the other part are at right angles to each other. However, the shape of the first sub-back member 4721 illustrated in FIG. 10b is illustrative and is not limited thereto. According to various embodiments, the 1-1 sub-back member 4721a and the 1-2 sub-back member 4721b may be transformed into various shapes corresponding to each other to surround edges of the second sub-back member 4722, and further, the first sub-back member 4721 may be formed in a shape in which the 1-1 sub-back member 4721a and the 1-2 sub-back member 4721b are integrally connected.

According to an embodiment, the second sub-back member 4722 may be disposed to surround the first back member 471. As one example, the first sub-back member 4721 may include a first sub-opening, and the second sub-back member 4722 may be disposed within the first sub-opening. The second sub-back member 4722 may include a second sub-opening, and the first back member 471 may be disposed within the second sub-opening. In FIGS. 10a and 10b, the remaining components except for the second back member 472 may be the same or similar to those in FIG. 9. Hereinafter, descriptions of the same or similar components as those of FIG. 9 may not be repeated.

According to an embodiment, the first back member 471 and the second sub-back member 4722 may be attached to the printed circuit board 450 while being spaced apart by a specified distance. For example, the first back member 471 and the second sub-back member 4722 may be disposed to be spaced apart by a first length L1.

According to an embodiment, the first back member 471, the first sub-back member 4721, and the second sub-back member 4722 may be formed to have different thicknesses. For example, the first back member 471 may be formed to have a first thickness T1. The first sub-back member 4721 may be formed to have a second thickness T2. The second sub-back member 4722 may be formed to have a third thickness T3 greater than the first thickness T1 and smaller than the second thickness T2. When the camera module 400 is mounted on the electronic device (e.g., the electronic device 100 or 300), the first sub-back member 4721 may contact the second support member 360 (e.g., the front case or the rear case) of the electronic device, and the first back member 471 may be disposed to be spaced apart from the second support member 360 of the electronic device by a second length L2.

According to an embodiment, the first sub-back member 4721 and the second sub-back member 4722 may be formed to have different widths. For example, the first sub-back member 4721 may be formed to have a first width W1, and the second sub-back member 4722 may be formed to have a second width W2 smaller than the first width W1. However, the widths of the first sub-back member 4721 and the second sub-back member 4722 are not limited to the illustrated embodiment. According to various embodiments, the first width W1 may be formed to be smaller than or equal to the second width W2.

According to an embodiment, when an external impact is applied to the electronic device, the external impact may be primarily absorbed or distributed through the first sub-back member 4721. In addition, when the first sub-back member 4721 is compressed by the external impact and the second sub-back member 4722 comes into contact with the second support member 360 of the electronic device, the external impact may be secondarily absorbed or distributed through the second sub-back member 4722. Accordingly, the external impact may be absorbed or distributed in stages through the first sub-back member 4721 and the second sub-back member 4722, and the amount of impact transmitted to the image sensor 451 through the first back member 471 may be reduced.

According to an embodiment, the first back member 471, the first sub-back member 4721, and the second sub-back member 4722 may be formed of the same material. As one example, the first back member 471 may include a metal plate including a flat surface having a specified flatness. The first sub-back member 4721 and the second sub-back member 4722 may be formed of a metal plate made of the same material as the first sub-back member 471.

According to an embodiment, the first sub-back member 4721 or the second sub-back member 4722 may be formed of a different material from the first back member 471. As one example, the second sub-back member 4722 may be formed of a metal material, and the first sub-back member 4721 may be formed of a shock-absorbing material (e.g., an elastic material). As another example, both the first sub-back member 4721 and the second sub-back member 4722 may be formed of shock absorbing materials.

Figure 11:
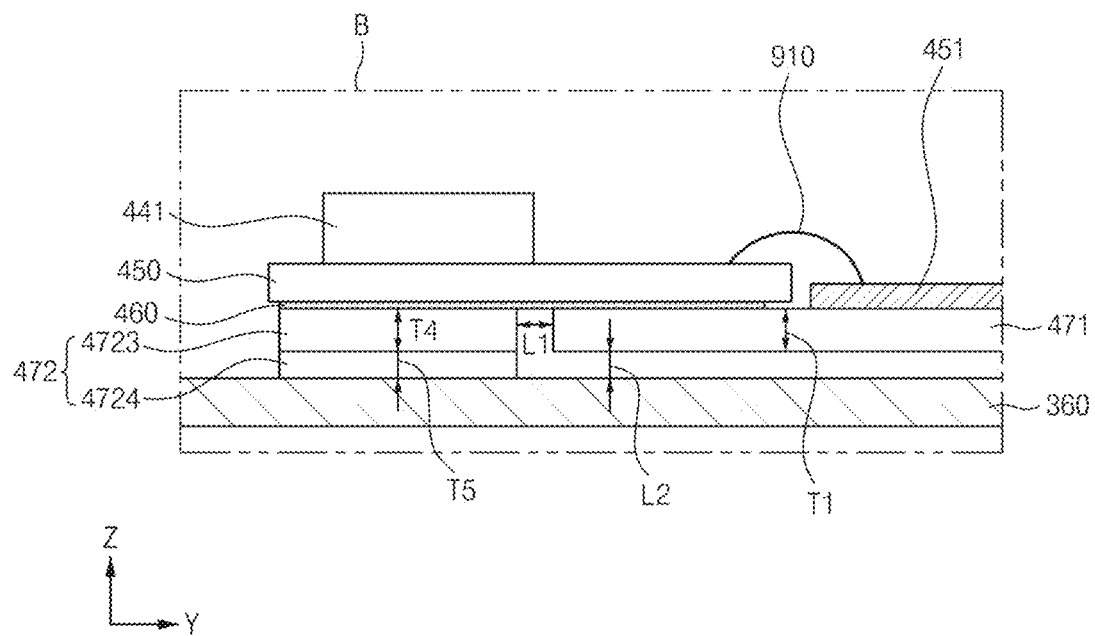
FIG. 11 is a partial cross-sectional view illustrating an example in which part B of FIG. 8 is enlarged according to various embodiments.

FIG. 11 is a partial cross-sectional view illustrating yet another example in which part B of FIG. 8 is enlarged according to various embodiments.

For convenience of description, FIG. 11 may be a view in which some (e.g., components such as the lens assembly 410, the second magnet member 4312a, the second coil 4312b, the flexible circuit board 442, the filter 458, or a filter holder) of the components of the camera module 400 are omitted. In addition, FIG. 11 may be a view in which the second support member 360 is illustrated together to describe the relationship between the camera module 400 and the second support member (e.g., the second support member 360 in FIG. 3).

Referring to FIG. 11, the second back member 472 may include a plurality of sub-back members. For example, the second back member 472 may include a third sub-back member 4723 and a fourth sub-back member 4724. The third sub-back member 4723 and the fourth sub-back member 4724 may be disposed in a stacked structure. As one example, the third sub-back member 4723 may be attached to the printed circuit board 450. The fourth sub-back member 4724 may be attached to the third sub-back member 4723. As one example, when viewed in the Z-axis direction, the third sub-back member 4723 and the fourth sub-back member 4724 may have substantially the same shape and size. In FIG. 11, the remaining components except for the second back member 472 may be the same or similar to those in FIG. 9. Hereinafter, descriptions of the same or similar components as those of FIG. 9 may not be repeated.

According to an embodiment, the first back member 471 and the second back member 472 may be attached to the printed circuit board 450 while being spaced apart by a specified distance. For example, the first back member 471 and the second back member 472 may be disposed to be spaced apart by a first length L1.

According to an embodiment, the first back member 471, the third sub-back member 4723, and the fourth sub-back member 4724 may be formed to have different thicknesses. For example, the first back member 471 may be formed to have a first thickness T1. The third sub-back member 4723 may be formed to have a fourth thickness T4. The fourth sub-back member 4724 may be formed to have a fifth thickness T5. When the camera module 400 is mounted on the electronic device (e.g., the electronic device 100 or 300), the fourth sub-back member 4724 may contact the second support member 360 (e.g., the front case or the rear case) of the electronic device, and the first back member 471 may be disposed to be spaced apart from the second support member 360 of the electronic device by a second length L2.

As another example, the first back member 471 and the third sub-back member 4723 may be formed to have the same thickness. For example, the fourth thickness T4 may be set to be substantially the same as the first thickness T1.

According to an embodiment, when an external shock is applied to the electronic device, the external shock may be transmitted to the third sub-back member 4723 through the fourth sub-back member 4724, and distributed to the printed circuit board 450 through the third sub-back member 4723. Accordingly, the external impact may be absorbed or distributed in stages through the fourth sub-back member 4724 and the third sub-back member 4723, and the amount of impact transmitted to the image sensor 451 through the first back member 471 may be reduced.

According to an embodiment, the first back member 471 and the third sub-back member 4723 may be formed of the same material. As one example, the first back member 471 may include a metal plate including a flat surface having a specified flatness. The third sub-back member 4723 may be formed of a metal plate made of the same material as the first back member 471. As one example, if the third sub-back member 4723 is formed of the same material and the same thickness as the first back member 471, manufacturing costs may be reduced by manufacturing the first back member 471 and the third sub-back member 4723 at once by cutting one metal plate.

According to an embodiment, the fourth sub-back member 4724 may be formed of a different material from the third sub-back member 4723. As one example, the third sub-back member 4723 may be formed of a metal material, and the fourth sub-back member 4724 may be formed of a shock-absorbing material (e.g., an elastic material). As another example, the third sub-back member 4723 and the fourth sub-back member 4724 may be formed of different shock absorbing materials.

Figure 12:
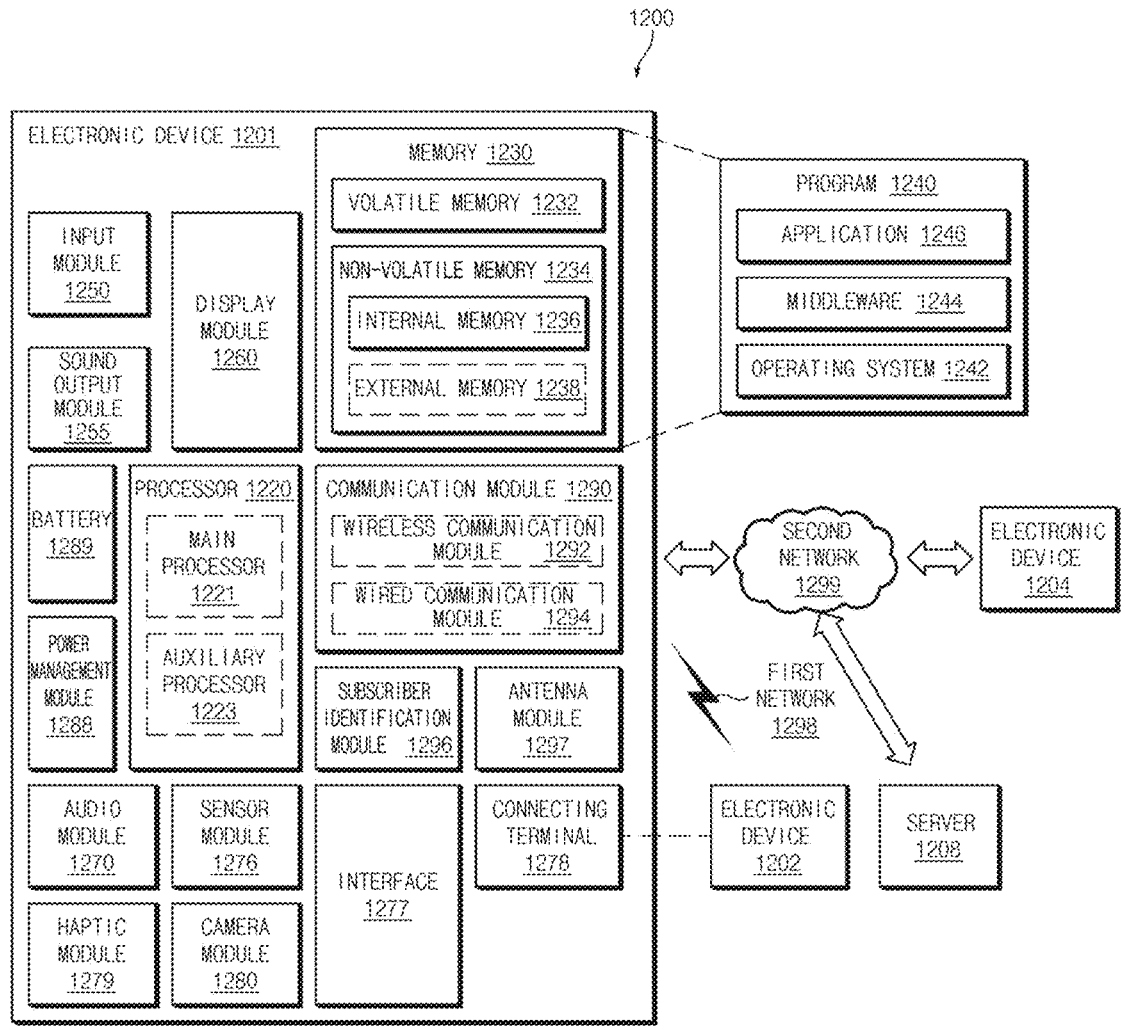
FIG. 12 is a block diagram illustrating an example electronic device in a network environment according to various embodiments.

FIG. 12 is a block diagram illustrating an example electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In various embodiments, at least one of the components (e.g., the connecting terminal 1278) may be omitted from the electronic device 1201, or one or more other components may be added in the electronic device 1201. In various embodiments, some of the components (e.g., the sensor module 1276, the camera module 1280, or the antenna module 1297) may be implemented as a single component (e.g., the display module 1260).

The processor 1220 may include various processing circuitry (as used herein, including the claims, the term "processor" may include various processing circuitry, including at least one processor, wherein one or more processors of at least one processor may be configured to perform the various functions described herein) and execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element including a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In an embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The camera module according to an example embodiment disclosed herein may include: a printed circuit board including a first opening, a housing assembly comprising a housing disposed on a first surface of the printed circuit board, the first back member comprising a plate disposed on a second surface of the printed circuit board and disposed to overlap the first opening and a portion of the printed circuit board, a second back member comprising a support disposed on the second surface of the printed circuit board, including a second opening in which the first back member is disposed, wherein the second back member is thicker than the first back member, an image sensor disposed on one surface of the first back member to be exposed toward the housing assembly through the first opening, and at least one lens aligned to have a same optical axis as the image sensor and disposed in an interior space of the housing assembly.

In various example embodiments, the first back member may include a metal plate having a flatness of a specified value or more.

In various example embodiments, the second back member include the same material as the first back member.

In various example embodiments, the second back member may include a shock absorbing material or a material having higher strength than the first back member.

In various example embodiments, the second back member may include a plurality of sub-back members.

In various example embodiments, the second back member may include the first sub-back member including a third opening and a second sub-back member disposed in the third opening and including a second opening.

In various example embodiments, the first back member have a first thickness, the first sub-back member have a second thickness greater than the first thickness, and the second sub-back member have a third thickness greater than the first thickness and less than the second thickness.

In various example embodiments, the first sub-back member comprise a shock absorbing material or a material having higher strength than the first back member, and the second sub-back member comprise the same material as the first back member.

In various example embodiments, the second back member may have a stacked structure in a direction of the optical axis, and include the first sub-back member attached to the printed circuit board and the second sub-back member attached to the first sub-back member.

In various example embodiments, the first back member have a first thickness, the first sub-back member have a second thickness equal to or greater than the first thickness, and the second sub-back member have a third thickness less than the first thickness.

In various example embodiments, the first sub-back member comprise the same material as the first back member, and the second sub-back member comprise a shock absorbing material or a material having higher strength than the first back member.

In various example embodiments, the first back member may be spaced apart from the second back member by a specified distance.

The electronic device according to an example embodiment disclosed herein may include: a first plate, a second plate, and a camera module at least partially disposed in a space formed between the first plate and the second plate, wherein the camera module includes: a printed circuit board including a first opening, a housing assembly comprising a housing disposed on a first surface of the printed circuit board, a first back member comprising a plate disposed on a second surface of the printed circuit board and disposed to overlap the first opening and a portion of the printed circuit board, a second back member comprising a support disposed on the second surface of the printed circuit board, including a second opening in which the first back member is disposed, wherein the second back member is thicker than the first back member, an image sensor disposed on one surface of the first back member to be exposed toward the housing assembly through the first opening, and the at least one lens aligned to have the same optical axis as the image sensor and disposed in an interior space of the housing assembly.

In various example embodiments, the electronic device may further include: a support disposed in a space formed between the first plate and the second plate, the second back member may be configured to support the camera module by contacting at least a portion of the support, and the first back member may be spaced apart from the support by a specified distance.

In various example embodiments, the first back member may include a metal plate having a flatness of a specified value or more.

In various example embodiments, the second back member may include a plurality of sub-back members.

In various example embodiments, the second back member may include the first sub-back member including a third opening and the second sub-back member disposed in the third opening and including the second opening.

In various example embodiments, the electronic device may further include the support disposed in a space formed between the first plate and the second plate, the first sub-back member may be configured to support the camera module by contacting at least a portion of the support, the second sub-back member may be spaced apart from the support by a first distance, and the first back member may be spaced apart from the support by a second distance greater than the first distance.

In various example embodiments, the second back member may have a stacked structure in a direction of the optical axis, and include the first sub-back member attached to the printed circuit board and the second sub-back member attached to the first sub-back member.

In various example embodiments, the first back member may have a first thickness, the first sub-back member may have a second thickness equal to or greater than the first thickness, and the second sub-back member may have a third thickness less than the first thickness.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A camera module comprising:
   a printed circuit board including a first opening;
   a housing assembly comprising a housing disposed on a first surface of the printed circuit board;
   a first back member comprising a plate disposed on a second surface of the printed circuit board and disposed to overlap the first opening and a portion of the printed circuit board;
   a second back member comprising a support disposed on the second surface of the printed circuit board, including a second opening in which the first back member is disposed, and having a thickness thicker than a thickness of the first back member;
   an image sensor disposed on one surface of the first back member and exposed toward the housing assembly through the first opening; and
   at least one lens disposed in an interior space of the housing assembly aligned to have a same optical axis as the image sensor.

2. The camera module of claim 1, wherein the first back member includes a metal plate having a flatness of a specified value or more.

3. The camera module of claim 2, wherein the second back member comprises a same material as the first back member.

4. The camera module of claim 1, wherein the second back member comprises a shock absorbing material or a material having higher strength than a strength of the first back member.

5. The camera module of claim 1, wherein the second back member includes a plurality of sub-back members.

6. The camera module of claim 1, wherein the second back member includes:
   a first sub-back member including a third opening; and
   a second sub-back member disposed in the third opening and including the second opening.

7. The camera module of claim 6, wherein the first back member has a first thickness, the first sub-back member has a second thickness greater than the first thickness, and the second sub-back member has a third thickness greater than the first thickness and less than the second thickness.

8. The camera module of claim 6, wherein the first back member comprises a shock absorbing material or a material having higher strength than a strength of the first back member, and the second sub-back member comprises a same material as the first back member.

9. The camera module of claim 1, wherein the second back member has a stacked structure in a direction of the optical axis, and the second back member includes:
a first sub-back member attached to the printed circuit board; and
a second sub-back member attached to the first sub-back member.

10. The camera module of claim 9, wherein the first back member has a first thickness, the first sub-back member has a second thickness equal to or greater than the first thickness, and the second sub-back member has a third thickness less than the first thickness.

11. The camera module of claim 9, wherein the first sub-back member comprises a same material as the first back member, and the second sub-back member comprises a shock absorbing material or a material having higher strength than a strength of the first back member.

12. The camera module of claim 1, wherein the first back member is spaced apart from the second back member by a specified distance.

13. An electronic device comprising:
a first plate;
a second plate; and
a camera module at least partially disposed in a space formed between the first plate and the second plate, wherein the camera module includes:
a printed circuit board including a first opening;
a housing assembly comprising a housing disposed on a first surface of the printed circuit board;
a first back member comprising a plate disposed on a second surface of the printed circuit board and disposed to overlap the first opening and a portion of the printed circuit board;
a second back member comprising a support disposed on the second surface of the printed circuit board, including a second opening in which the first back member is disposed, and having a thickness thicker than a thickness of the first back member;
an image sensor disposed on one surface of the first back member and exposed toward the housing assembly through the first opening; and
at least one lens disposed in an interior space of the housing assembly aligned to have a same optical axis as the image sensor.

14. The electronic device of claim 13, further comprising a support disposed in a space formed between the first plate and the second plate, wherein the second back member is configured to support the camera module by contacting at least a portion of the support, and the first back member is spaced apart from the support by a specified distance.

15. The electronic device of claim 13, wherein the second back member has a stacked structure in a direction of the optical axis, the second back member includes:
a first sub-back member attached to the printed circuit board; and
a second sub-back member attached to the first sub-back member, the first back member has a first thickness, the first sub-back member has a second thickness equal to or greater than the first thickness, and the second sub-back member has a third thickness less than the first thickness.

16. The electronic device of claim 13, wherein the first back member includes a metal plate having a flatness of a specified value or more.

17. The electronic device of claim 13, wherein the second back member includes a plurality of sub-back members.

18. The electronic device of claim 17, wherein the second back member includes:
a first sub-back member including a third opening; and
a second sub-back member disposed in the third opening and including the second opening.

19. The electronic device of claim 18, further comprising a support disposed in a space formed between the first plate and the second plate.

20. The electronic device of claim 19, wherein the first sub-back member is configured to support the camera module by contacting at least a portion of the support, and the second sub-back member is spaced apart from the support by a first distance, and the first sub-back member is spaced apart from the support by a second distance greater than the first distance.

\* \* \* \* \*